United States Patent
Shinogi

(10) Patent No.: US 8,234,921 B2
(45) Date of Patent: Aug. 7, 2012

(54) LIQUID SEAL SENSOR

(75) Inventor: Masataka Shinogi, Chiba (JP)

(73) Assignee: Seiko Instruments Inc. (JP)

( * ) Notice: Subject to any disclaimer, the term of this patent is extended or adjusted under 35 U.S.C. 154(b) by 465 days.

(21) Appl. No.: 12/313,467

(22) Filed: Nov. 20, 2008

(65) Prior Publication Data

US 2009/0139329 A1 Jun. 4, 2009

(30) Foreign Application Priority Data

Nov. 30, 2007 (JP) ................................ 2007-311382
Feb. 13, 2008 (JP) ................................ 2008-031243

(51) Int. Cl.
 *G01P 15/00* (2006.01)
(52) U.S. Cl. .................. 73/514.09; 73/514.06
(58) Field of Classification Search ............... 73/514.06, 73/514.07, 514.08, 514.09, 514.12, 514.13, 73/64.48, 64.49, 64.52
See application file for complete search history.

(56) References Cited

U.S. PATENT DOCUMENTS

| | | | | |
|---|---|---|---|---|
| 2,391,966 A * | 1/1946 | Harrison | ................... | 73/514.09 |
| 3,024,662 A * | 3/1962 | Ryan | ......................... | 73/514.09 |
| 3,164,023 A * | 1/1965 | Holderer | ..................... | 73/514.09 |
| 3,279,245 A * | 10/1966 | Golden | ..................... | 73/862.381 |
| 3,530,726 A * | 9/1970 | Young | ......................... | 73/514.09 |
| 4,395,908 A * | 8/1983 | Shopland | ................... | 73/514.09 |
| 4,676,103 A * | 6/1987 | Nakajima | ................... | 73/514.09 |
| 4,707,927 A * | 11/1987 | Hiyama | ..................... | 33/366.19 |
| 4,901,571 A * | 2/1990 | Reinhardt et al. | ......... | 73/514.12 |
| 5,046,056 A * | 9/1991 | Sallas et al. | .................... | 367/166 |
| 5,587,531 A * | 12/1996 | Kawakami et al. | ........ | 73/514.12 |
| 5,668,319 A * | 9/1997 | Garabedian | ................ | 73/514.09 |
| 6,276,206 B1 * | 8/2001 | Reime | ......................... | 73/514.09 |
| 7,080,553 B2 * | 7/2006 | Luo et al. | ................... | 73/514.05 |

OTHER PUBLICATIONS

Patent Abstracts of Japan, Publication No. 05-026754 Publication Date, Feb. 2, 1993.

* cited by examiner

*Primary Examiner* — Helen C. Kwok
(74) *Attorney, Agent, or Firm* — Adams & Wilks

(57) ABSTRACT

To provide a small-sized liquid seal sensor that can enhance degrees of freedom in detection directions. A liquid seal sensor having a liquid seal part that seals a liquid therein, and a detecting part that detects changes in the liquid sealed in the liquid seal part has a configuration in which the detecting part detects changes in the liquid sealed in the liquid seal part, and thus when an acceleration is applied, the detecting part detects changes in the liquid sealed in the liquid seal part, whereby the sensitivity to accelerations can be enhanced in any directions.

22 Claims, 9 Drawing Sheets

LIQUID SEAL SENSOR

BACKGROUND OF THE INVENTION

1. Field of the Invention

The present invention relates to a liquid seal sensor that uses a liquid sealed therein for sensing.

2. Description of the Related Art

Generally, sensors detect a physical quantity or its change such as force, pressure, displacement, speed, acceleration, and angular velocity, and convert the detected result into an electric signal to output the signal. These sensors are incorporated in various electronic appliances and the like, and widely used for detecting states, automatic control and the like.

Among others, because a semiconductor sensor formed of a semiconductor device is solid state, the semiconductor sensor has such advantages that the sensor is resistant to vibrations, acceleration and the like, and has high reliability. On this account, a variety of semiconductor sensors are developed to be mounted on various consumer electronics, automobiles and the like refer to JP-A-5-26754.

However, it is becoming difficult to three-dimensionally build a semiconductor sensor on a semiconductor substrate as the sensor is further scaled down and thinner. Consequently, it is becoming difficult to enhance degrees of freedom in detection directions, not only in an in-plane direction in X- and Y-directions but also in a vertical direction in a Z-direction and in a direction about an axis in a θ direction.

Then, the invention has been proposed in the light of circumstances before. An object is to provide a novel liquid seal sensor that uses a liquid sealed therein for sensing as a sensor that can enhance degrees of freedom in detection directions.

SUMMARY OF THE INVENTION

In order to achieve the object above, a liquid seal sensor according to the invention is characterized by a liquid seal part that seals a liquid therein; and a detecting part that detects changes in the liquid sealed in the liquid seal part.

In the liquid seal sensor, in applying an acceleration in a certain direction, the detecting part detects changes in the liquid sealed in the liquid seal part, whereby the sensitivity to accelerations can be enhanced in any directions. In other words, when an acceleration is applied to the liquid seal sensor, the liquid is moved (biased) in the liquid seal part in the direction in which the acceleration is applied, and thus degrees of freedom in detection directions can be enhanced with this simple configuration. Moreover, in the liquid seal sensor, the viscosity of the liquid sealed in the liquid seal part is changed to easily and freely set the detection sensitivity.

In addition, preferably, in the liquid seal part above, a surface on which a droplet of the liquid is formed is covered with a flexible film, whereby the liquid is airtightly sealed in a droplet state.

In this case, although the liquid seal part above is formed in a simple structure, the liquid seal part can be fabricated in a small size at low costs.

Moreover, preferably, the flexible film above is formed of a paraxylylene resin film formed by a chemical vapor deposition method.

In this case, the surface on which the droplet of the liquid is formed is covered with a paraxylylene resin film formed by a chemical vapor deposition method, whereby the liquid can be airtightly sealed in the droplet state. Therefore, the paraxylylene resin film formed by a chemical vapor deposition method is greatly suitable as the flexible film above.

In addition, preferably, the liquid above is formed of a silicone oil.

In this case, the silicone oil is excellent in heat resistance and cold resistance and has a small temperature dependency of viscosity as well, and it is greatly suitable as the liquid above sealed in the liquid seal part.

In addition, for the detecting part above, any one of a contact device, a capacitive device, a piezoelectric device, or an optical detecting device can be used.

In addition, the liquid seal sensor according to the invention may have a movable body that is provided to freely move in the liquid of the liquid seal part; and a control part that returns the moved movable body to a standby position in the liquid seal part.

In this case, in fabricating the liquid seal part of the liquid seal sensor, the movable body holds the liquid so as to help the surface tension of the liquid, and thus the shaping of the liquid seal part is facilitated to enhance the degrees of freedom of shapes.

In addition, the movable body above may have a specific gravity greater than that of the liquid.

In this case, when an acceleration is applied to the liquid seal sensor, the movable body having a specific gravity greater than that of the liquid is moving in the liquid to increase changes in the liquid, and thus the detection sensitivity of the detecting part is enhanced as well as the accuracy is improved. In addition, when the applied acceleration is reduced, the movable body is returned to the original standby position by the control part, and thus the accuracy of detection is secured.

In addition, the movable body above may be formed in a spherical shape, and the control part may be formed in a concave shape to hold the movable body.

In this case, since the resistance against moving in the liquid is reduced to facilitate the move of the movable body, changes in the liquid are more reliably increased. Therefore, the accuracy of detection by the detecting part is more improved. In addition, for example, the control part is formed in a concave shape such as almost a conical hole shape or almost a bowl shape, and the moved movable body is spontaneously returned to the original standby position. In other words, the control part does not require special external energy and the like in order to return the movable body to the standby position, which is simply configured.

In addition, the movable body above may be formed of one of a metal material having a property being magnetically attracted or a magnetic member that generates magnetic force, and the control part may be formed of the other.

In this case, for example, the movable body is formed of a metal material having a property being attracted by reacting with the magnetic force such as iron, cobalt, nickel or gadolinium, or an alloy containing these or the like. In addition, the control part is formed of a magnetic member that generates the magnetic force such as the magnet and the like. Then, in the state in which no accelerations are applied to the liquid seal sensor, the movable body is held at the standby position by the magnetic force generated by the control part. In addition, in the state in which an acceleration is applied to the liquid seal sensor, the movable body moves in the liquid of the liquid seal part against the magnetic force above to increase changes in the liquid. In addition, when the applied acceleration is reduced, the attraction of the control part to quickly return the movable body to the original standby position. Accordingly, the liquid seal sensor can cope with a wider variety of demands for detection.

In addition, a liquid seal sensor according to the invention is characterized by comprising: a liquid seal part that seals therein a movable body movable in a liquid and the liquid; and a detecting part that detects changes of the movable body sealed inside the liquid seal part.

In the liquid seal sensor, instead of using changes in the liquid of the liquid seal part as the liquid seal sensor does described above, changes of the movable body of the liquid seal part are used for detection by the detecting part. In addition, in this case, for example, the liquid seal sensor can be configured to use a metal material having a magnetic property as the movable body as well as to use a magnetic sensor formed of a magnetic resistance device, a hole device and the like as the detecting part.

BRIEF DESCRIPTION OF THE DRAWINGS

In the accompanying drawing.

DETAILED DESCRIPTION OF THE PREFERRED EMBODIMENTS

Figure 1A:
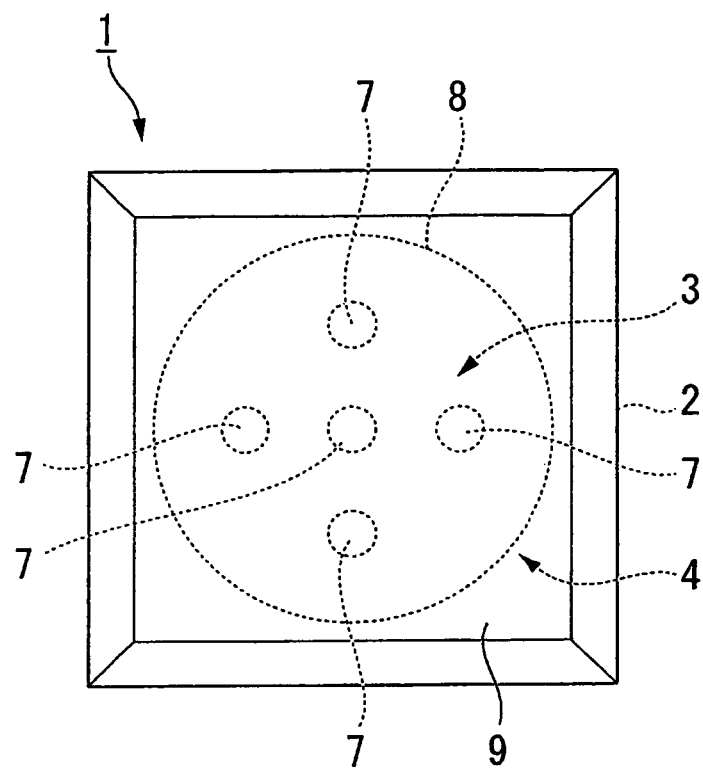
FIGS. 1A and 1B are liquid seal sensor shown as a first embodiment, 1A shows a plan view and 1B shows a cross section thereof.

As described above, according to the invention, a small-sized liquid seal sensor that can enhance degrees of freedom in detection directions can be provided at low costs.

Hereinafter, a liquid seal sensor to which the invention is adapted will be described in detail with reference to the drawings. In addition, for the sake of clarity of features, in the drawings used in the discussions below, a featured portion is sometimes enlarged for convenience, and the dimensions and ratios of individual components are not always the same as the real dimensions and ratios.

First Embodiment

First, a liquid seal sensor 1 shown in FIG. 1 will be described as a first embodiment.

Figure 1B:
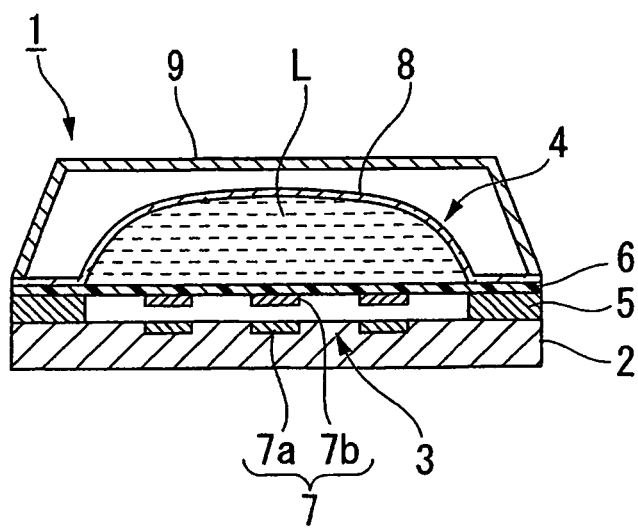

As shown in FIGS. 1A and 1B, this liquid seal sensor 1 has a detecting part 3 arranged on a substrate 2, and a liquid seal part 4 arranged on the detecting part 3, in which the detecting part 3 detects changes in the liquid L sealed in the liquid seal part 4, and the detected result is converted into an electric signal to output the signal.

For the substrate 2, although a silicon substrate, a glass substrate, a plastic substrate and the like can be used, for example, the material is not necessarily limited to these materials. In addition, the substrate 2 may be one that forms the detecting part 3, described later, or one that forms a part thereof, or one that partially forms the liquid seal part 4. In addition, on the substrate 2, a wiring and the like that are electrically connected to the detecting part 3 may be formed.

The detecting part 3 uses contact devices as those detecting changes in the liquid L sealed in the liquid seal part 4. More specifically, the detecting part 3 has a structure in which a diaphragm 6 is bonded to the substrate 2 through a spacer 5 to provide a space between the substrate 2 and the diaphragm 6. Then, on the surfaces of the substrate 2 and the diaphragm 6 facing each other, contact devices 7 formed of a pair of contact electrodes 7a and 7b facing each other are provided. In addition, the contact devices 7 are arranged at the center part of the liquid seal part 4 and on both sides of two directions orthogonal to each other as the center part is in between when the substrate 2 is seen in plane. In other words, the contact devices 7 are arranged at the center part of the detecting part 3 and at four places as the center part is in between, five places in total. In addition, the arrangement and number of the contact devices 7 are not necessarily limited to such a configuration. For example, such configurations may be possible that the contact devices 7 are arranged at the center part and at eight places as the center part is in between, nine places in total, and that a plurality of the contact devices 7 are arranged in an array.

In addition, in each of the contact devices 7, the contact electrode 7a, one of a pair of the contact electrodes 7a and 7b, is embedded in the substrate 2, and the contact electrode 7b, the other of the pair, is patterned on the diaphragm 6. However, the configuration is not necessarily limited to such a configuration. In addition, although not shown in the drawing, the substrate 2 and the diaphragm 6 have wirings and the like electrically connected to each of the contact electrodes 7a and 7b.

The liquid seal part 4 has a structure in which the surface on which a droplet of the liquid L is formed is covered with a flexible film 8 to airtightly seal the liquid L in the droplet state. More specifically, in the liquid seal part 4, a proper amount of the liquid L is dropped onto the detecting part 3 above, and a chemical vapor deposition method (CVD method) is used to form the flexible film 8 formed of a paraxylylene resin film, referred to as parylene on the surface on which the droplet of the liquid L is formed, whereby the liquid L is airtightly sealed in the droplet state. Paraxylylene resins are excellent in gas barrier properties, chemical resistance, heat resistance, cold resistance and the like. As these paraxylylene resins, for example, polymonochloroparaxylylene, parylene C, polyparaxylylene, parylene N, polydichloroparaxylylene, parylene D and the like can be named. Then, parylenes formed according to the CVD method can airtightly seal the liquid L in the droplet state, which can be easily made smaller, and thus parylenes are highly suitable as the flexible film 8 above.

As the liquid L, such a liquid may be sufficient that it can be sealed with a parylene. For example, a silicone oil, a xylene oil, a grease and the like can be used. Among others, a silicone oil is excellent in heat resistance and cold resistance, and the temperature dependency of viscosity is small as well, and thus a silicone oil is greatly suitable as the liquid L sealed in the liquid seal part 4 above.

In addition, the liquid seal sensor 1 has a structure in which a package 9 is covered over the substrate 2, whereby the liquid seal part 4 above is sealed in the airtight space between the package 9 and the substrate 2.

Figure 2A:
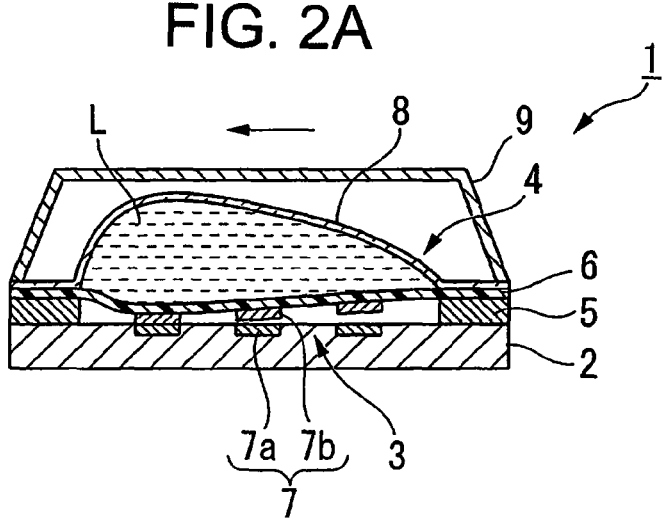
FIGS. 2A, 2B and 2C are cross section illustrative of sensing by the liquid seal sensor shown in FIGS. 1A, 1B and 2A shows a diagram depicting the state in which the acceleration is applied on one side, 2B shows a diagram depicting the static state, and 2C shows a diagram depicting the state in which acceleration is applied on the other side.
Figure 2B:
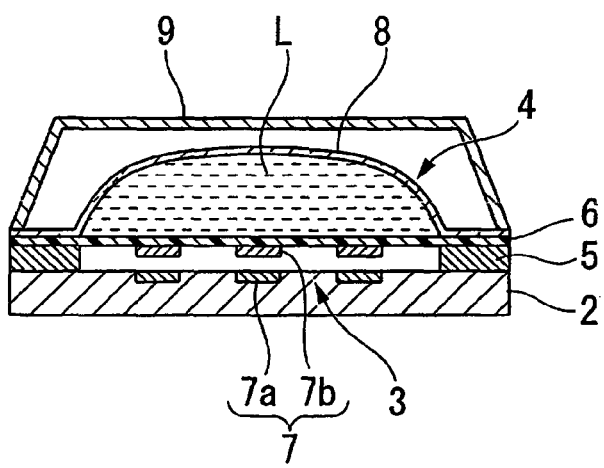
Figure 2C:
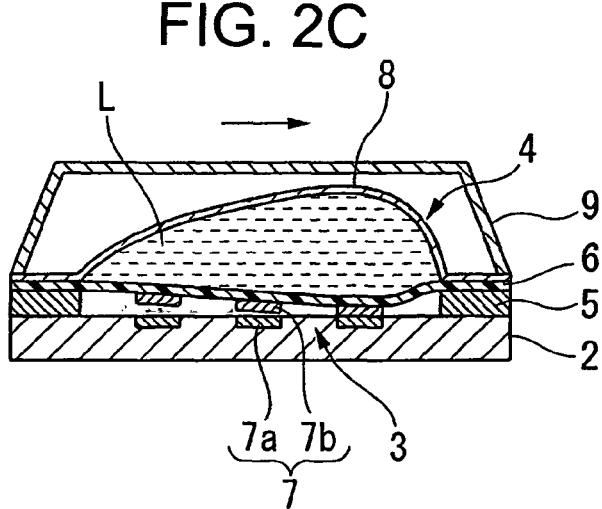

For example, the liquid seal sensor 1 having the structure described above functions as an acceleration sensor that measures accelerations applied to an object. More specifically, as shown in FIGS. 2A to 2C, in the liquid seal sensor 1, since in applying an acceleration in a certain direction, the liquid L in the liquid seal part 4 is moving in the direction of the acceleration applied to the liquid seal sensor 1, the bias of the liquid L, the bias in the weight distribution of the liquid L, is generated in the direction in which the acceleration is applied according to the degree of the acceleration. At this time, in the detecting part 3, the diaphragm 6 is bent in the portion of which the bias in the weight distribution of the liquid L is generated, whereby a pair of the contact electrodes 7a and 7b of the contact device 7 in this portion are brought into contact with each other. Thus, in the detecting part 3, the degree and direction of the bias of the liquid L sealed in the liquid seal part 4 are detected, and the detected result is converted into an electric signal to output the signal. Accordingly, in the liquid seal sensor 1, the direction and degree of the acceleration can be measured.

As discussed above, in the liquid seal sensor 1, in applying an acceleration in a certain direction, the detecting part 3 detects changes in the liquid L sealed in the liquid seal part 4, whereby the sensitivity to accelerations can be enhanced in any directions. In other words, when an acceleration is applied to the liquid seal sensor 1, the liquid L in the liquid seal part 4 is moved (biased) in the direction in which the acceleration is applied, and thus degrees of freedom in detection directions can be enhanced with this simple configuration.

In addition, in the liquid seal sensor 1, the viscosity of the liquid L sealed in the liquid seal part 4 is changed to easily and freely set the detection sensitivity. Moreover, in the liquid seal sensor 1, because of the configuration in which the detecting part 3 detects changes in the liquid L sealed in the liquid seal part 4, changes in the characteristics caused by the temperature are small, and the detection sensitivity can be stabilized.

In addition, the invention is not necessarily limited to the configuration of the liquid seal sensor 1, which can be modified variously within the scope not deviating from the teachings of the invention.

For example, in addition to the contact device 7 above that detects changes in the liquid L sealed in the liquid seal part 4, for instance, the liquid seal sensor 1 above is configured to use a capacitive device, a piezoelectric device, a resistance device, an optical detecting device, a magnetic sensor and the like.

In addition, the liquid seal sensor 1 above is not limited to one that functions as the acceleration sensor described above. For example, the liquid seal sensor 1 can be used as an angular velocity sensor (gyro sensor) that measures the angular velocity applied to an object, a pressure sensor that measures pressure applied to an object, and the like, which can be widely used as a sensor that uses a liquid sealed in for sensing.

Second Embodiment

Next, a liquid seal sensor 20 shown in FIGS. 3A and 3B will be described as a second embodiment.

Figure 3A:
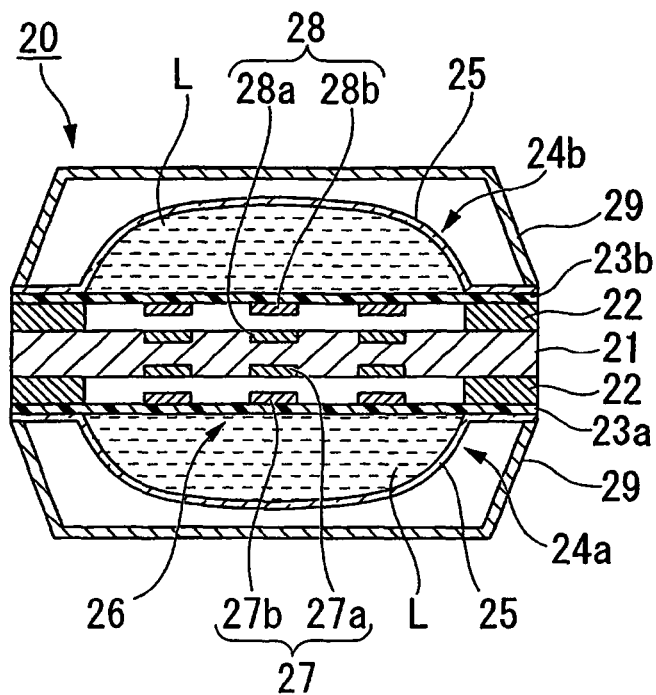
FIGS. 3A and 3B are liquid seal sensor shown as a second embodiment, 3A shows a plan view and 3B shows a cross section thereof.
Figure 3B:
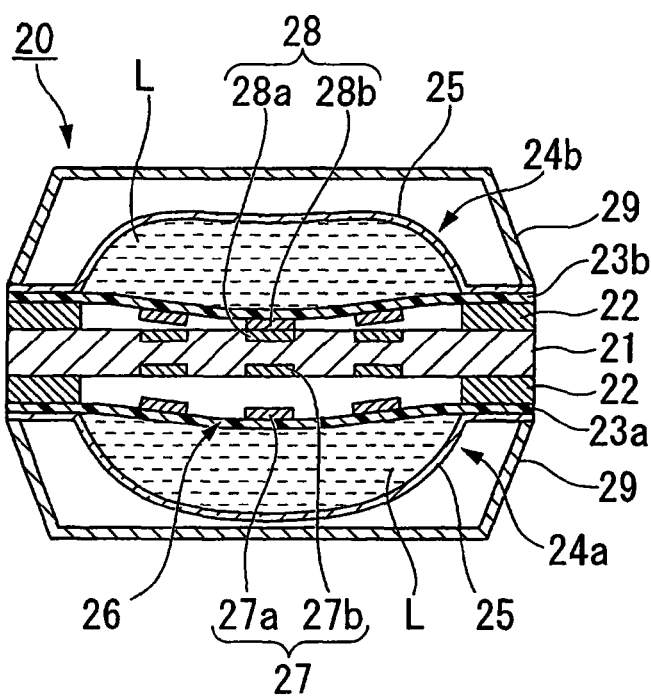

As shown in FIG. 3A, this liquid seal sensor 20 has a structure in which a pair of diaphragms 23a and 23b are bonded on both surfaces of a substrate 21 through a spacer 22 to provide a space between the substrate 21 and a pair of the diaphragms 23a and 23b. In addition, on the surfaces opposed to the surfaces of a pair of the diaphragms 23a and 23b facing each other, a pair of liquid seal parts 24a and 24b that seal a liquid L therein are arranged, respectively.

For example, for the substrate 21, although a silicon substrate, a glass substrate, a plastic substrate and the like can be used, the material is not necessarily limited to these materials. In addition, the substrate 21 may be one that forms a detecting part 26, described later, or one that forms a part thereof, or one that partially forms the liquid seal parts 24a and 24b. In addition, on the substrate 21, a wiring and the like that are electrically connected to the detecting part 26 may be formed.

As similar to the liquid seal part 4 above, a pair of the liquid seal parts 24a and 24b have a structure in which the surface on which a droplet of the liquid L is formed is covered with flexible film 25 to airtightly seal the liquid L in the droplet state. More specifically, in a pair of the liquid seal parts 24a and 24b, a proper amount of the liquid L is dropped onto each of the diaphragms 23a and 23b, and a CVD method is used to form the flexible film 25 formed of a parylene on the surface on which the droplet of the liquid L is formed, whereby the liquid L is airtightly sealed in the droplet state.

The liquid seal sensor 20 uses a capacitive device as the detecting part 26 that detects changes in the liquid L sealed in a pair of the liquid seal parts 24a and 24b. More specifically, on the surfaces of the diaphragm 23a, one of the pair, and the substrate 21 facing each other, a first capacitive device 27 is provided, which is formed of a pair of electrodes 27a and 27b facing each other. In addition, on the surfaces of the diaphragm 23b, the other of the pair, and the substrate 21 facing each other, a second capacitive device 28 is provided, which is formed of a pair of electrodes 28a and 28b facing each other.

These first and second capacitive devices 27 and 28 are arranged at the center part of a pair of the liquid seal parts 24a and 24b and on both sides of two directions orthogonal to each other as the center part is in between when the substrate 21 is seen in plane. In other words, the first and second capacitive devices 27 and 28 are arranged at the center part of the detecting part 26 and at four places as the center part is in between, five places in total. In addition, the arrangement and number of the first and second capacitive devices 27 and 28 are not necessarily limited to such a configuration. For example, such configurations may be possible that the first and second capacitive devices 27 and 28 are arranged at the center part and at eight places as the center part is in between, nine places in total, and that a plurality of the first and second capacitive devices 27 and 28 are arranged in an array.

In addition, in each of the first and second capacitive devices 27 and 28, in a pair of the electrodes 27a and 27b and a pair of the electrodes 28a and 28b, the electrodes 27a and 28a, ones of the pairs, are embedded in the substrate 21, and the electrodes 27b and 28b, the others of the pairs, are patterned on the diaphragms 23a and 23b. However, the configuration is not necessarily limited to such a configuration. In addition, although not shown in the drawing, the substrate 21 and a pair of the diaphragms 23a and 23b are provided with a wiring and the like that are electrically connected to each of the electrodes 27a and 27b and each of the electrodes 28a and 28b.

In addition, the liquid seal sensor 20 may have a structure in which a package 29 is covered over a pair of the diaphragms 23a and 23b to seal the liquid seal parts 24a and 24b above in the airtight spaces between the package 29 and a pair of the diaphragms 23a and 23b.

For example, the liquid seal sensor 20 having the structure described above functions as an acceleration sensor that measures acceleration applied to an object. More specifically, in the liquid seal sensor 20, since in applying an acceleration in a certain direction, the liquid L in a pair of the liquid seal parts 24*a* and 24*b* is moving in the direction of the acceleration applied to the liquid seal sensor 20, the bias of the liquid L, the bias in the weight distribution of the liquid L, is generated according to the degree of the acceleration in the direction in which the acceleration is applied. At this time, in the detecting part 26, a pair of the diaphragms 23*a* and 23*b* are bent in the portions of which the bias in the weight distribution of the liquid L is generated, whereby the capacitance of the first and second capacitive devices 27 and 28 in these portions is changed. Thus, in the detecting part 26, the degree and direction of the bias of the liquid L sealed in a pair of the liquid seal parts 24*a* and 24*b* are detected, and the detected result is converted into an electric signal to output the signal. Accordingly, in the liquid seal sensor 20, the direction and degree of the acceleration can be measured.

Particularly, in the liquid seal sensor 20 having such a structure, the sensitivity to accelerations in the direction orthogonal to the diaphragms 23*a* and 23*b* (hereinafter, referred to as the vertical direction) can be enhanced. More specifically, in the liquid seal sensor 20 as shown in FIG. 3B, in applying an acceleration in the vertical direction, the liquid L in a pair of the liquid seal parts 24*a* and 24*b* is moving in the direction of the acceleration applied to the liquid seal sensor 20. In other words, in the detecting part 26, since the liquid L in a pair of the liquid seal parts 24*a* and 24*b* is moving on one side of the vertical direction, the diaphragms 23*a* and 23*b* are bent in the same the direction. For example, in the case shown in FIG. 3B, a pair of the electrodes 27*a* and 27*b* configuring the first capacitive device 27 are separated from each other on one hand, and a pair of the electrodes 28*a* and 28*b* configuring the second capacitive device 28 come close to each other on the other hand. In this case, changes in the capacitance of the first and the second capacitive device 27 are opposite. Accordingly, in the liquid seal sensor 20, the sensitivity to accelerations in the vertical direction can be enhanced.

As discussed above, in the liquid seal sensor 20, in applying an acceleration in a certain direction, the detecting part 26 detects changes in the liquid L sealed in a pair of the liquid seal parts 24*a* and 24*b*, whereby the sensitivity to accelerations can be enhanced in any directions. In other words, when an acceleration is applied to the liquid seal sensor 20, the liquid L in a pair of the liquid seal parts 24*a* and 24*b* is moved (biased) in the direction in which the acceleration is applied, and thus degrees of freedom in detection directions can be enhanced with this simple configuration.

In addition, in the liquid seal sensor 20, the viscosity of the liquid L sealed in a pair of the liquid seal parts 24*a* and 24*b* is changed to easily and freely set the detection sensitivity. Moreover, in the liquid seal sensor 20, because of the configuration in which the detecting part 26 detects changes in the liquid L sealed in a pair of the liquid seal parts 24*a* and 24*b*, changes in the characteristics caused by the temperature are small, and the detection sensitivity can be stabilized.

In addition, the liquid seal sensor 20 above is not limited to one that functions as acceleration sensor described above. For example, the liquid seal sensor 20 can be used as an angular velocity sensor, gyro sensor that measures the angular velocity applied to an object, a pressure sensor that measures pressure applied to an object, and the like, which can be widely used as a sensor that uses a liquid sealed in for sensing.

Third Embodiment

Next, a liquid seal sensor 40 shown in FIGS. 4A and 4B will be described as a third embodiment.

Figure 4A:
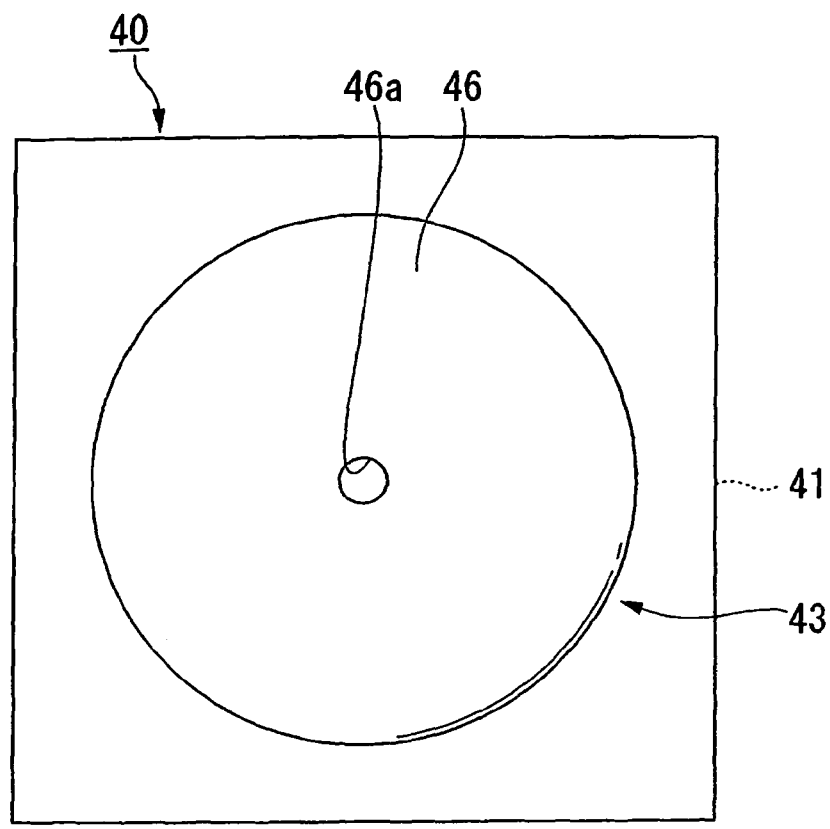
FIGS. 4A and 4B are liquid seal sensor shown as a third embodiment, 4A shows a plan view and 4B shows a cross section thereof.
Figure 4B:
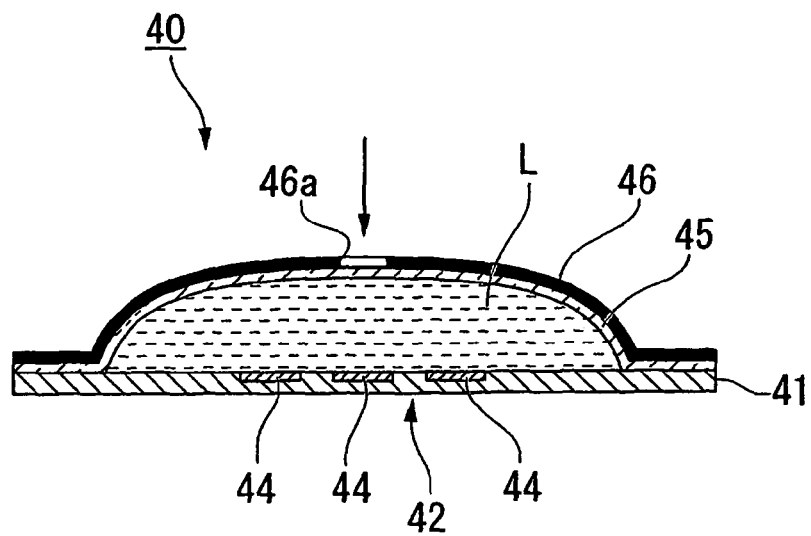

As shown in FIGS. 4A and 4B, this liquid seal sensor 40 has a detecting part 42 arranged in a substrate 41, and a liquid seal part 43 arranged on the detecting part 42, in which the detecting part 42 detects changes in a liquid L sealed in the liquid seal part 43, and the detected result is converted into an electric signal to output the signal.

For example, for the substrate 41, although a silicon substrate, a glass substrate, a plastic substrate and the like can be used, the material is not necessarily limited to these materials. In addition, the substrate 41 may be one that forms the detecting part 42, described later, or one that forms a part thereof, or one that partially forms the liquid seal part 43. In addition, on the substrate 41, a wiring and the like that are electrically connected to the detecting part 42 may be formed.

The detecting part 42 uses an optical detecting device such as a photodetector as one that detects changes in the liquid L sealed in the liquid seal part 43. More specifically, The detecting part 42 has a plurality of optical detecting devices 44 arranged in an array on the substrate 41. The optical detecting devices 44 are arranged at the center part of the liquid seal part 43 and on both sides of two directions orthogonal to each other as the center part is in between when the substrate 41 Is seen in plane. In other words, the optical detecting devices 44 are arranged at the center part of the detecting part 42 and at four places as the center part is in between, five places in total. In addition, although not shown in the drawing, the substrate 41 is provided with a wiring and the like that are electrically connected to each of the optical detecting devices 44. In addition, the arrangement and number of the optical detecting devices 44 are not necessarily limited to such a configuration. For example, such configurations may be possible that the optical detecting devices 44 are arranged at the center part and at eight places as the center part is in between, nine places in total, and that a plurality of the optical detecting devices 44 are arranged in an array.

The liquid seal part 43 has a structure in which the surface on which a droplet of the liquid L is formed is covered with a flexible film 45 to airtightly seal the liquid L in the droplet state. More specifically, in the liquid seal part 43, a proper amount of the liquid L is dropped onto the detecting part 42 above, and a CVD method is used to form the flexible film 45 formed of a parylene on the surface on which the droplet of the liquid L is formed, whereby the liquid L is airtightly sealed in the droplet state.

In addition, on the flexible film 45, a light shielding film 46 is provided, which covers the liquid seal part 43. For example, the light shielding film 46 is formed of an Al film and the like, which is formed so as to cover the surface on which the flexible film 45 is formed by using a CVD method. In addition, the light shielding film 46 is provided with an opening 46*a*. The opening 46*a* is provided at the center above the liquid seal part 43, that is, the opening 46*a* is positioned at the center part of the detecting part 42 when the substrate 41 is seen in plane.

For example, the liquid seal sensor 40 having the structure described above functions as an acceleration sensor that measures acceleration applied to an object. More specifically, in the liquid seal sensor 40, since in applying an acceleration in a certain direction, the liquid L in the liquid seal part 43 is moving in the direction of the acceleration applied to the liquid seal sensor 40, the distortion of the liquid seal part 43 is generated according to the degree of the acceleration in the direction in which the acceleration is applied. Consequently, the position of the opening 46*a* provided in the light shielding film 46 is shifted. At this time, in the detecting part 42, changes in the light intensity of the received light are detected while a plurality of the optical detecting devices 44 are receiving the light passing through the opening 46*a*. Accordingly, in the liquid seal sensor 40, based on the signals outputted from each of the optical detecting devices 44, the direction and degree of the acceleration can be measured.

As described above, in the liquid seal sensor 40, in applying an acceleration in a certain direction, the detecting part 42 detects changes in the liquid L sealed in the liquid seal part 43, whereby the sensitivity to accelerations can be enhanced in any directions. In other words, when an acceleration is applied to the liquid seal sensor 40, the liquid L in the liquid seal part 43 is moved (biased) in the direction in which the acceleration is applied, and thus degrees of freedom in detection directions can be enhanced with this simple configuration.

In addition, in the liquid seal sensor 40, the viscosity of the liquid L sealed in the liquid seal part 43 is changed to easily and freely set the detection sensitivity. Moreover, in the liquid seal sensor 40, because of the configuration in which the detecting part 42 detects changes in the liquid L sealed in the liquid seal part 43, changes in the characteristics caused by the temperature are small, and the detection sensitivity can be stabilized.

In addition, the invention is not necessarily limited to the configuration of the liquid seal sensor 40 shown as the third embodiment above, which can be modified variously within the scope not deviating from the teachings of the invention.

Figure 5A:
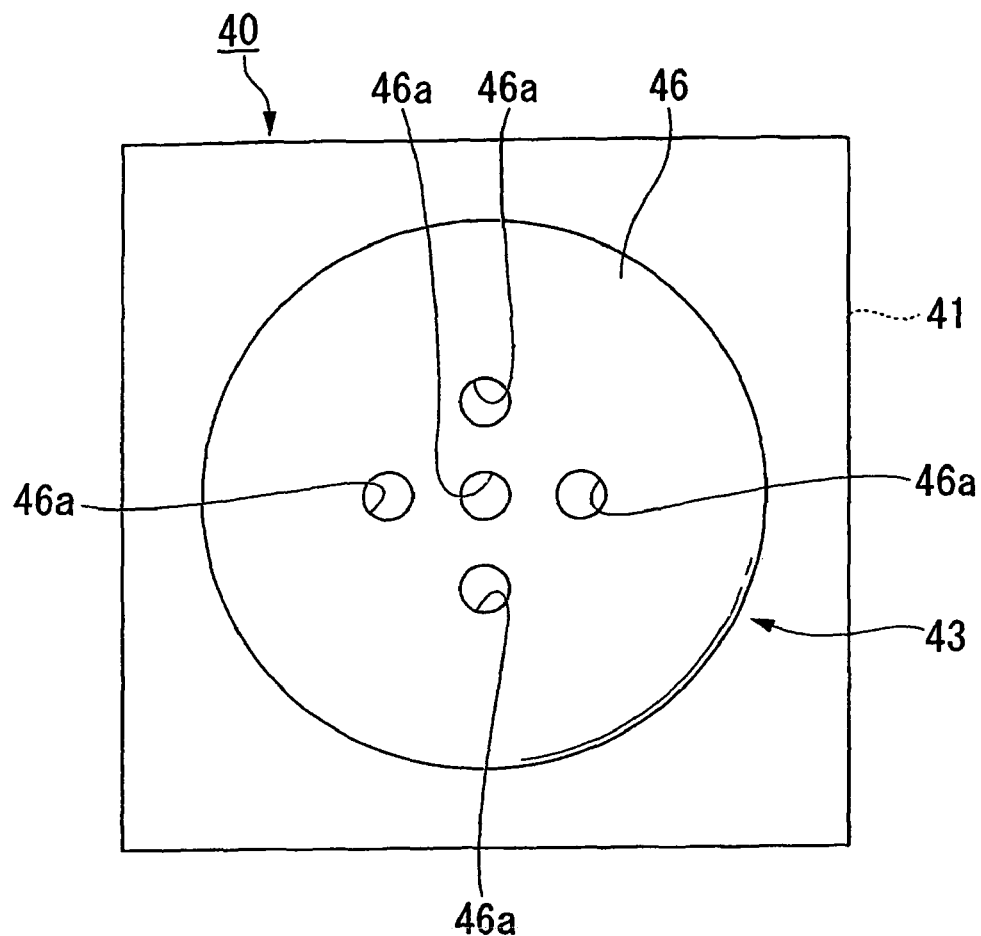
FIGS. 5A and 5B are modification of the liquid seal sensor shown as the third embodiment, 5A shows a plan view and 5B shows a cross section thereof.
Figure 5B:
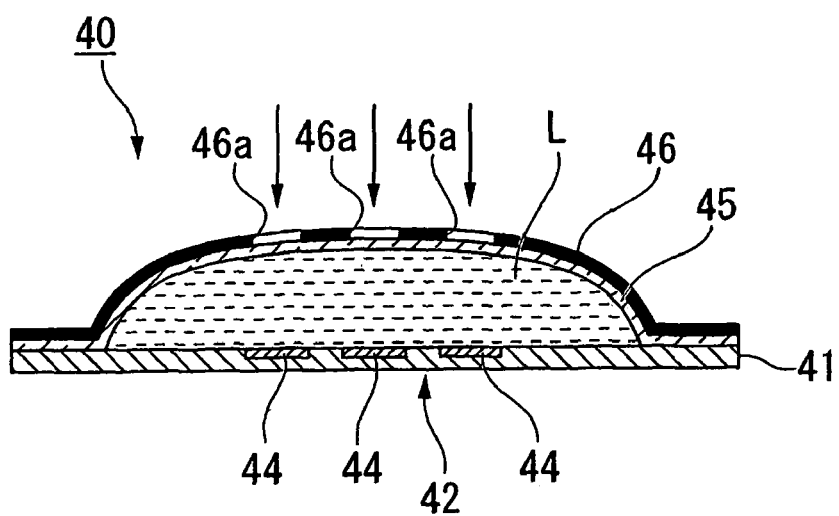

For example, as shown in FIGS. 5A and 5B, the liquid seal sensor 40 above may be configured to provide a plurality of the openings 46a in the light shielding film 46. More specifically, a plurality of the openings 46a are formed in the light shielding film 46 above so as to be positioned right above each of the optical detecting devices 44 described above.

In this case, in the detecting part 42, the light intensity received by each of the optical detecting devices 44 is changed while a plurality of the optical detecting devices 44 are receiving the light passing through a plurality of the openings 46a. Therefore, also in this case, the direction and degree of the acceleration can be measured from the signals outputted from each of the optical detecting devices 44.

In addition, the liquid seal sensor 40 above is not limited to one that functions as the acceleration sensor described above. For example, the liquid seal sensor 40 can be used as an angular velocity sensor, gyro sensor that measures the angular velocity applied to an object, a pressure sensor that measures pressure applied to an object, and the like, which can be widely used as a sensor that uses a liquid sealed in for sensing.

Fourth Embodiment

Next, a liquid seal sensor 60 shown in FIGS. 6A and 6B will be described as a fourth embodiment.

Figure 6A:
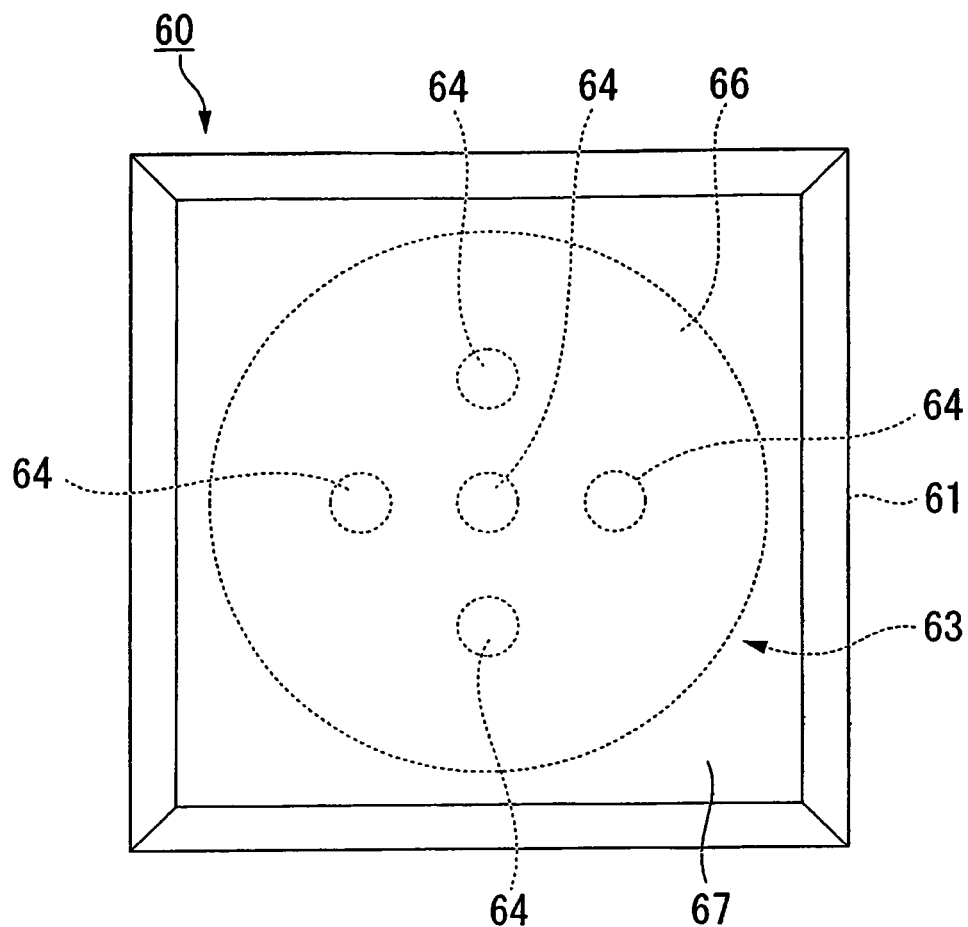
FIGS. 6A and 6B are liquid seal sensor shown as a fourth embodiment, 6A shows a plan view and 6B shows a cross section thereof.
Figure 6B:
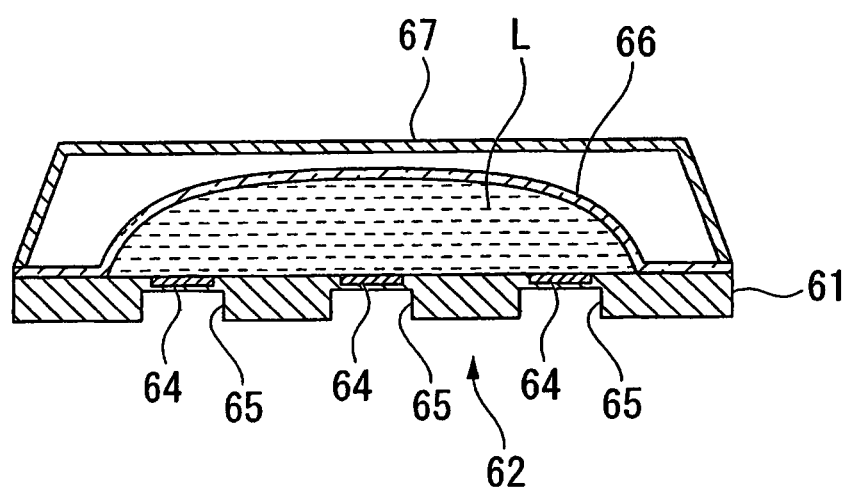

As shown in FIGS. 6A and 6B, this liquid seal sensor 60 has a detecting part 62 arranged on a substrate 61, and a liquid seal part 63 arranged on the detecting part 62, in which the detecting part 62 detects changes in a liquid L sealed in the liquid seal part 63, and the detected result is converted into an electric signal to output the signal.

For example, for the substrate 61, although a silicon substrate, a glass substrate, a plastic substrate and the like can be used, the material is not necessarily limited to these materials. In addition, the substrate 61 may be one that forms the detecting part 62, described later, or one that forms a part thereof, or one that partially forms the liquid seal part 63. In addition, on the substrate 61, a wiring and the like that are electrically connected to the detecting part 62 may be formed.

The detecting part 62 uses a piezoelectric device formed of lead zirconium titanate, PZT, and the like as one that detects changes in the liquid L sealed in the liquid seal part 63. More specifically, the detecting part 62 has a plurality Of piezoelectric devices 64 arranged on the substrate 61. The piezoelectric devices 64 are arranged in an array at the center part of the liquid seal part 63 and on both sides of two directions orthogonal to each other as the center part is in between when the substrate 61 is seen in plane. In other words, the piezoelectric devices 64 are arranged at the center part of the detecting part 62 and at four places as the center part is in between, five places in total. In addition, on the substrate 61, a plurality of recessed parts 65 are provided, which reduces the thickness of the position at which each of the piezoelectric devices 64 is arranged. In addition, although not shown in the drawing, the substrate 61 is provided with a wiring and the like that are electrically connected to each of the piezoelectric devices 64. In addition, the arrangement and number of the piezoelectric devices 64 are not necessarily limited to such a configuration. For example, such configurations may be possible that the piezoelectric devices 64 are arranged at the center part and at eight places as the center part is in between, nine places in total, and that a plurality of the piezoelectric devices 64 are arranged in an array.

The liquid seal part 63 has a structure in which the surface on which a droplet of the liquid L is formed is covered with the flexible film 66 to airtightly seal the liquid L in the droplet state. More specifically, in the liquid seal part 63, a proper amount of the liquid L is dropped onto the detecting part 62 above, and a CVD method is used to form the flexible film 66 formed of a parylene on the surface on which the droplet of the liquid L is formed, whereby the liquid L is airtightly sealed in the droplet state.

In addition, the liquid seal sensor 60 has a structure in which a package 67 is covered over the substrate 61 to seal the liquid seal part 63 above in the airtight space between the package 67 and the substrate 61.

For example, the liquid seal sensor 60 having the structure described above functions as an acceleration sensor that measures acceleration applied to an object. More specifically, in the liquid seal sensor 60, since in applying an acceleration in a certain direction, the liquid L in the liquid seal part 63 is moving in the direction of the acceleration applied to the liquid seal sensor 60, the bias of the liquid L (the bias in the weight distribution of the liquid L) is generated according to the degree of the acceleration in the direction in which the acceleration is applied. At this time, in the detecting part 62, pressure exerted on the piezoelectric devices 64 by the liquid L is increased against the piezoelectric device 64 in the portion in which the bias in the weight distribution is generated. Thus, in the detecting part 62, the degree and direction of the bias of the liquid L sealed in the liquid seal part 63 are detected, and the detected result is converted into an electric signal to output the signal. Accordingly, in the liquid seal sensor 60, the direction and degree of the acceleration can be measured.

As described above, in the liquid seal sensor 60, in applying an acceleration in a certain direction, the detecting part 62 detects changes in the liquid L sealed in the liquid seal part 63, whereby the sensitivity to accelerations can be enhanced in any directions. In other words, when an acceleration is applied to the liquid seal sensor 60, the liquid L in the liquid seal part 63 is moved biased in the direction in which the acceleration is applied, and thus degrees of freedom in detection directions can be enhanced with this simple configuration.

In addition, in the liquid seal sensor 60, the viscosity of the liquid L sealed in the liquid seal part 63 is changed to easily and freely set the detection sensitivity. Moreover, in the liquid seal sensor 60, because of the configuration in which the detecting part 62 detects changes in the liquid L sealed in the liquid seal part 63, changes in the characteristics caused by the temperature are small, and the detection sensitivity can be stabilized.

In addition, the liquid seal sensor 60 above is not limited to one that functions as the acceleration sensor described above. For example, the liquid seal sensor 60 can be used as an angular velocity sensor, gyro sensor that measures the angular velocity applied to an object, a pressure sensor that measures pressure applied to an object, and the like, which can be widely used as a sensor that uses a liquid sealed in for sensing.

Fifth Embodiment

Next, a liquid seal sensor 80 shown in FIGS. 7A and 7B will be described as a fifth embodiment.

Figure 7A:
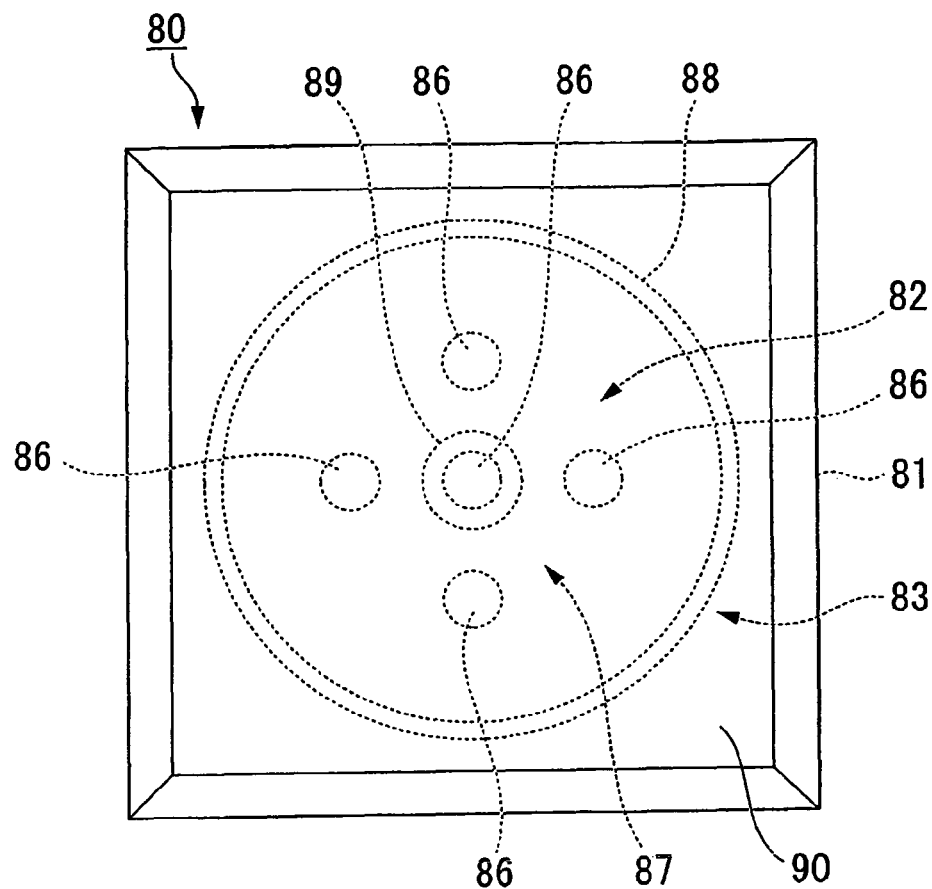
FIGS. 7A and 7B are liquid seal sensor shown as a fifth embodiment, 7A shows a plan view and 7B shows a cross section thereof.
Figure 7B:
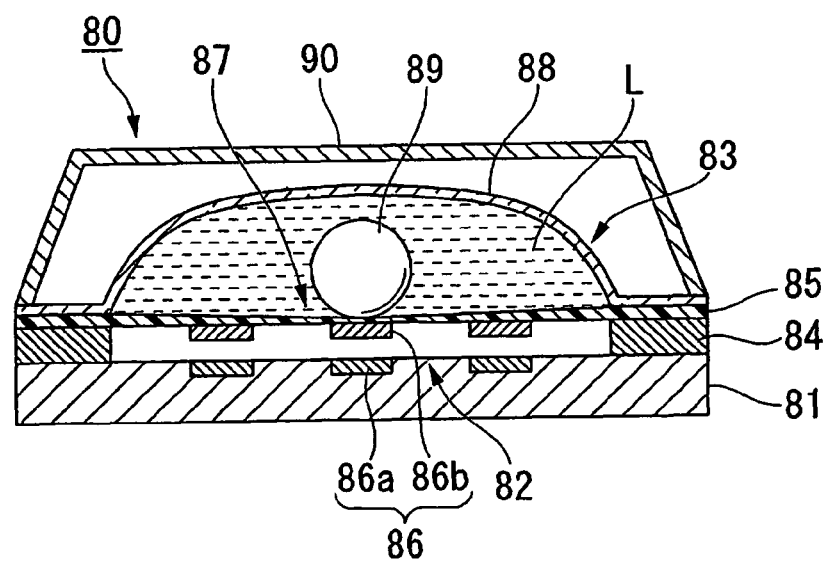

As shown in FIGS. 7A and 7B, the liquid seal sensor 80 has a detecting part 82 arranged on a substrate 81, and a liquid seal part 83 arranged on the detecting part 82, in which the detecting part 82 detects changes in a liquid L sealed in the liquid seal part 83, and the detected result is converted into an electric signal to output the signal.

For example, for the substrate 81, although a silicon substrate, a glass substrate, a plastic substrate and the like can be used, the material is not necessarily limited to these materials. In addition, the substrate 81 may be one that forms the detecting part 82, described later, or one that forms a part thereof, or one that partially forms the liquid seal part 83. In addition, on the substrate 81, a wiring and the like that are electrically connected to the detecting part 82 may be formed.

The detecting part 82 uses a contact device as one that detects changes in the liquid L sealed in the liquid seal part 83. More specifically, the detecting part 82 has a structure in which a diaphragm 85 is bonded on the substrate 81 through a spacer 84 to provide a space between the substrate 81 and the diaphragm 85. Then, on the surfaces of the substrate 81 and the diaphragm 85 facing each other, a contact device 86 is provided, which is formed of a pair of contact electrodes 86a and 86b facing each other. In addition, the contact devices 86 are arranged at the center part of the liquid seal part 83 and on both sides of two directions orthogonal to each other as the center part is in between when the substrate 81 is seen in plane. In other words, the contact devices 86 are arranged at the center part of the detecting part 82 and at four places as the center part is in between, five places in total. In addition, the arrangement and number of the contact devices 86 are not necessarily limited to such a configuration. For example, such configurations may be possible that the contact devices 86 are arranged at the center part and at eight places as the center part is in between, nine places in total, and that a plurality of the contact devices 86 are arranged in an array.

In addition, in each of the contact devices 86, the contact electrode 86a, one of a pair of the contact electrodes 86a and 86b, is embedded in the substrate 81, and the contact electrode 86b, the other of the pair, is patterned in the diaphragm 85. However, the configuration is not necessarily limited to such a configuration. In addition, although not shown in the drawing, the substrate 81 and the diaphragm 85 are provided with a wiring and the like that are electrically connected to each of the contact electrodes 86a and 86b.

For example, the diaphragm 85 is formed of a polyimide film, a silicon film and the like having flexibility. In addition, on the surface of the diaphragm 85 on the liquid L side, a concave-shaped control part 87 is formed, which is almost a conical hole shape or almost a bowl shape. As shown in FIG. 7B, the control part 87 is formed in such a way that the surface is gradually inclined downward from around the diaphragm 85 toward almost the center, in which the deepest portion is arranged almost at the center and is the standby position of the movable body, described later. In addition, it is sufficient that the control part 87 is formed in a concave shape, which is not limited to the embodiment, and which may be a cylindrical hole shape with multiple steps, a bowl shape or the other shapes, for example. In addition, in the case in which the diaphragm 85 is formed of a polyimide film, it is more preferable because the patterning of the control part 87 and the contact electrode 86b is facilitated.

The liquid seal part 83 has a structure in which the periphery of the spherical movable body 89 is covered with a droplet of the liquid L and the surface on which the droplet is formed is covered with a flexible film 88 to airtightly seal the liquid L in the droplet state. More specifically, in the liquid seal part 83, the movable body 89 is placed on the detecting part 82 above, a proper amount of the liquid L is dropped so as to cover the movable body 89, and a CVD method is used to form the flexible film 88 formed of a parylene on the surface on which the droplet of the liquid L is formed, whereby the liquid L is airtightly sealed in the droplet state. With this structure, since the movable body 89 holds the liquid so as to help the surface tension of the liquid L, the shaping of the liquid seal part is facilitated to increase the degrees of freedom of the shape. In other words, for example, the thickness of the liquid seal part 83 in the vertical direction orthogonal to the diaphragm 85 of the liquid seal sensor 80, the vertical direction in FIG. 7B, can be made thicker as well.

As the liquid L, such a liquid may be sufficient that it can be sealed with a parylene. For example, a silicone oil, a xylene oil, a grease and the like can be used. Among others, a silicone oil is excellent in heat resistance and cold resistance, and the temperature dependency of viscosity is small as well, and thus a silicone oil is greatly suitable as the liquid L sealed in the liquid seal part 83 above.

In addition, the movable body 89 is freely movable in the liquid L in the flexible film 88 of the liquid seal part 83. The movable body 89 is formed of a metal material and the like having a specific gravity greater than that of the liquid L. In addition, the movable body 89 is placed at the control part 87 of the diaphragm 85. In the state in which no accelerations are applied to the liquid seal sensor 80, the movable body 89 is held at the deepest portion of the control part 87 standby position.

In addition, the liquid seal sensor 80 has a structure in which a package 90 is covered over the substrate 81 to seal the liquid seal part 83 above in the airtight space between the package 90 and the substrate 81.

Figure 8A:
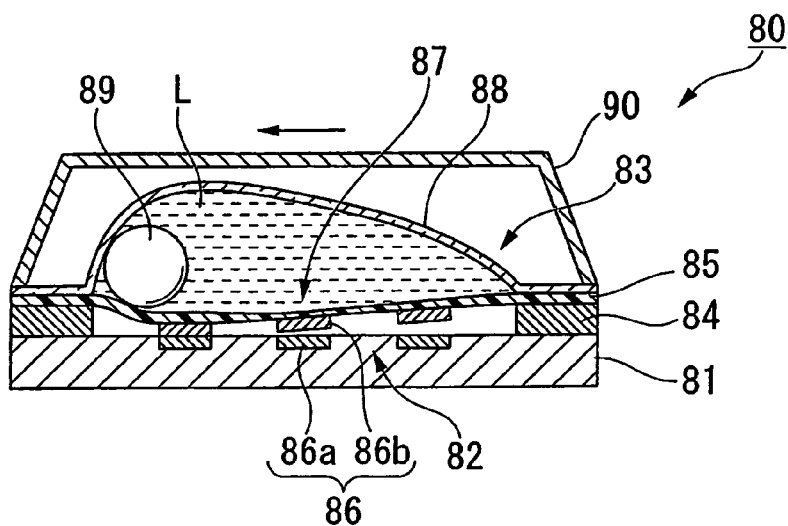
FIGS. 8A, 8B and 8C are cross section illustrative of sensing by the liquid seal sensor shown in FIGS. 7A, 7B and 8A shows a diagram depicting the state in which the acceleration is applied on one side, 8B shows a diagram depicting the static state, and 8C shows a diagram depicting the state in which acceleration is applied on the other side.
Figure 8B:
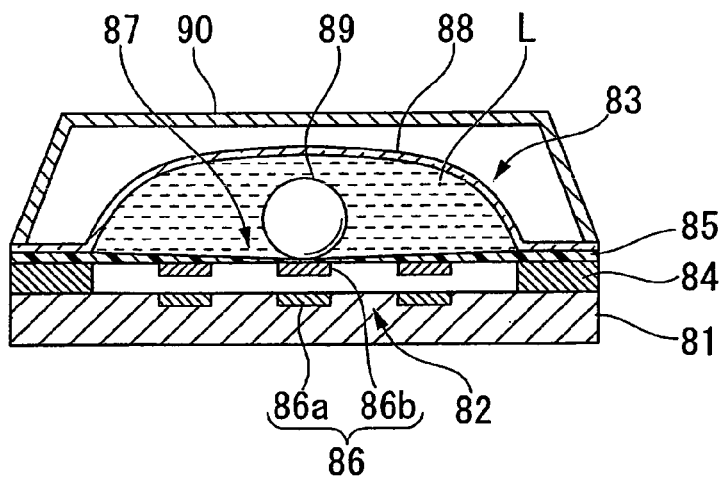
Figure 8C:
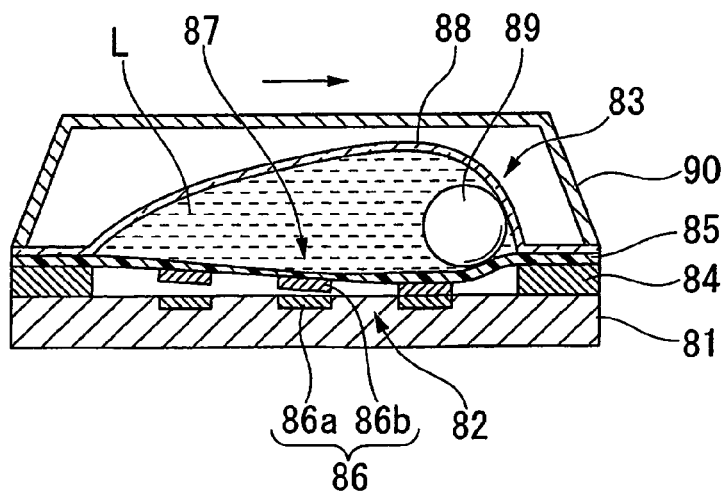

For example, the liquid seal sensor 80 having the structure described above functions as an acceleration sensor that measures acceleration applied to an object. More specifically, as shown in FIGS. 8A to 8C, in the liquid seal sensor 80, since in applying an acceleration in a certain direction, the liquid L in the liquid seal part 83 is moving in the direction of the acceleration applied to the liquid seal sensor 80, the bias in the weight distribution of the liquid L is generated according to the degree of the acceleration in the direction in which the acceleration is applied. Moreover, in the liquid L according to the embodiment, the movable body 89 having a specific gravity greater than that of the liquid L is movably arranged, and thus the movable body 89 moves as well in the direction in which the acceleration is applied. Then, the weight of the movable body 89 is applied to the bias in the weight distribution of the liquid L to more reliably generate the bias above.

At this time, in the detecting part 82, the diaphragm 85 is bent in the portion of which the bias in the weight distribution of the liquid L is generated, whereby a pair of the contact electrodes 86a and 86b of the contact device 86 in this portion are brought into contact with each other. Thus, in the detecting part 82, the degree and direction of the bias of the liquid L sealed in the liquid seal part 83 are detected, and the detected result is converted into an electric signal to output the signal. Accordingly, in the liquid seal sensor 80, the direction and degree of the acceleration can be measured.

In addition, when the acceleration applied to the liquid seal sensor 80 is reduced, as shown in FIG. 8B, the movable body 89 is returned to the deepest portion standby position along the slope of the control part 87 of the diaphragm 85, and held thereon.

As described above, in the liquid seal sensor 80, in applying an acceleration in a certain direction, the detecting part 82 detects changes in the liquid L sealed in the liquid seal part 83, whereby the sensitivity to accelerations can be enhanced in any directions. In other words, when an acceleration is applied to the liquid seal sensor 80, the liquid L in the liquid seal part 83 is moved, biased, in the direction in which the acceleration is applied, and thus degrees of freedom in detection directions can be enhanced with this simple configuration. Moreover, in the embodiment, since the move of the movable body 89 increases changes in the liquid L, the detection sensitivity by the detecting part 82 is enhanced as well as the accuracy is improved.

In addition, because the movable body 89 is formed in a spherical shape, the resistance in moving in the liquid L is reduced to facilitate moving as well as changes in the liquid L are more reliably increased. Therefore, the accuracy of detection by the detecting part 82 is more improved.

In addition, when the applied acceleration is reduced, the movable body 89 is returned to the original standby position by the control part 87, and thus the accuracy of detection is secured. In other words, since the control part 87 is formed in a concave shape, when the applied acceleration is reduced, the moved movable body 89 is spontaneously returned to the original standby position. Accordingly, the control part 87 does not require special external energy and the like in order to return the movable body 89 to the standby position, which is simply configured.

In addition, in the liquid seal sensor 80, the viscosity of the liquid L sealed in the liquid seal part 83 is changed to easily and freely set the detection sensitivity. Moreover, in the liquid seal sensor 80, because of the configuration in which the detecting part 82 detects changes in the liquid L sealed in the liquid seal part 83, changes in the characteristics caused by the temperature are small, and the detection sensitivity can be stabilized.

In addition, the invention is not necessarily limited to the configuration of the liquid seal sensor 80 above, which can be modified variously within the scope not deviating from the teachings of the invention.

For example, the shape of the movable body 89 is not limited to a spherical shape according to the embodiment, which may be the other shapes such as nearly a cube, nearly a rectangular parallelepiped, nearly a disk or nearly a cylinder.

In addition, the number is not limited to one, and a plurality of the movable bodies 89 may be provided.

In addition, the specific gravity of the movable body 89 is described as it is greater than that of the liquid L, which is not limited thereto.

In addition, in addition to the contact device 86 above, the liquid seal sensor 80 above may be configured to use a capacitive device, a piezoelectric device, a resistance device, a magnetic sensor and the like, for example, as one that detects changes in the liquid L sealed in the liquid seal part 83.

In addition, the detecting part 82 may be configured to detect changes of the movable body 89 instead of detecting changes in the liquid L. In this case, for example, the detecting part 82 can be configured to use a metal material having a magnetic property as the movable body 89 as well as to use a magnetic sensor formed of a magnetic resistance device, a hole device and the like as the detecting part 82.

In addition, the liquid seal sensor 80 above is not limited to one that functions as the acceleration sensor described above. For example, the liquid seal sensor 80 can be used as an angular velocity sensor, gyro sensor that measures the angular velocity applied to an object, a pressure sensor that measures pressure applied to an object, and the like, which can be widely used as a sensor that uses a liquid sealed in for sensing.

Figure 9A:
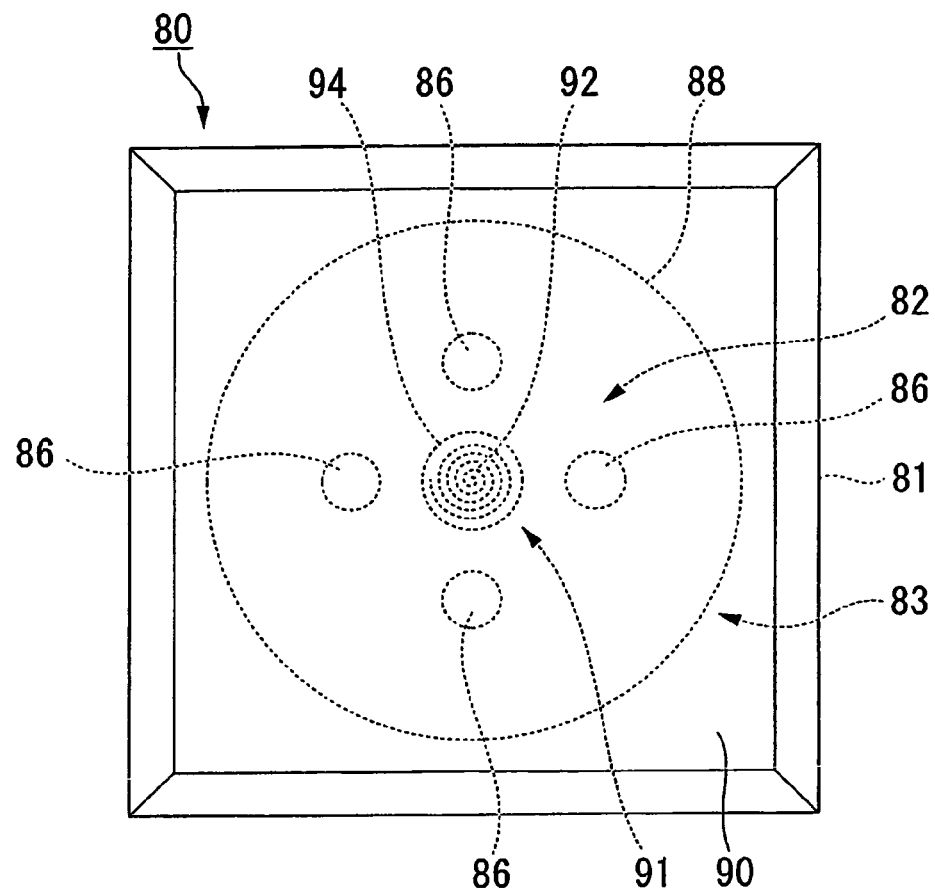
FIGS. 9A and 9B are modification of the liquid seal sensor shown as the fifth embodiment, 9A shows a plan view and 9B shows a cross section thereof.
Figure 9B:
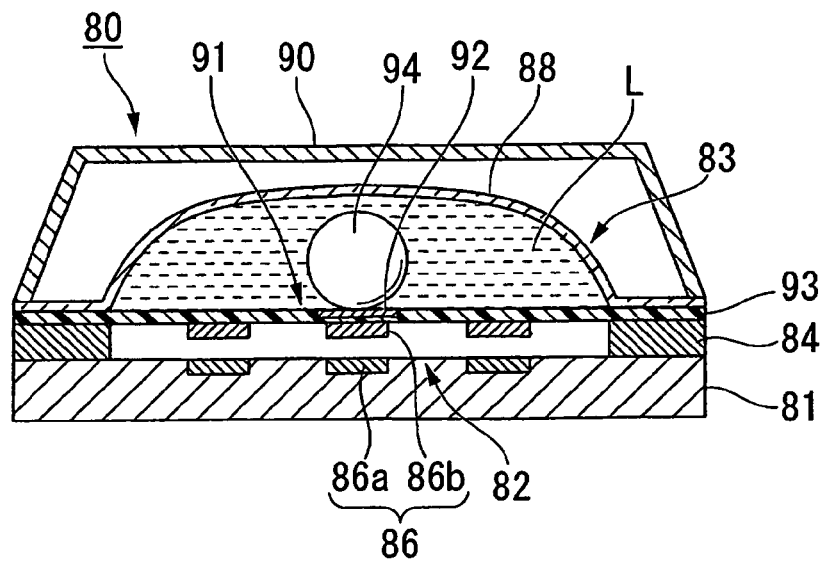

In addition, as shown in a modification in FIGS. 9A and 9B, the liquid seal sensor 80 above according to the invention may have a curl magnetic coil magnetic member 92 formed of a Ni alloy as a control part 91, for example. For instance, the magnetic coil 92 is arranged almost at the center of a diaphragm 93 formed of a polyimide film, which is electrically connected to a wiring and the like, not shown, and is applied with current to generate magnetic force. Then, the portion almost at the center at which the magnetic coil 92 is arranged is set to the standby position of a movable body 94.

The movable body 94 is formed of a metal material having a property being attracted by reacting with the magnetic force such as iron, cobalt, nickel or gadolinium, or alloys containing these or the like, which is formed in a spherical shape. In addition, when an acceleration is applied to the liquid seal sensor 80, the movable body 94 can be moved in a liquid L of the liquid seal part 83 against the magnetic force of the magnetic coil 92.

In other words, when an acceleration is applied, the movable body 94 moves in the liquid L to increase changes in the liquid L, whereas when the applied acceleration is reduced, the movable body 94 is quickly returned to the original standby position by the attraction of the control part 91 generating the magnetic force, and held at the position. Accordingly, the embodiment can cope with a wider variety of demands for detection.

In addition, as the control part 91, a magnet and the like may be used, which generates magnetic force all the time, instead of the magnetic coil 92.

In addition, such a configuration may be possible that the control part 91 is formed of a metal material having a property being attracted by reacting with magnetic force and the movable body 94 is formed of a magnet and the like that generates magnetic force.

What is claimed is:

1. A liquid seal sensor comprising:
   a liquid seal part that seals a liquid therein, the liquid seal part comprising a flexible diaphragm, and a flexible film covering the diaphragm and sealed about its periphery to the diaphragm to define therebetween a space in which is sealed the liquid; and
   a detecting part disposed beneath the diaphragm and that detects acceleration applied to the liquid seal sensor based on a bias in the weight distribution of the liquid that is generated by movement of the liquid in the liquid seal part in the direction of the acceleration.

2. The liquid seal sensor according to claim 1, wherein the flexible film is formed of paraxylylene.

3. The liquid seal sensor according to claim 1, wherein the liquid is a silicone oil.

4. The liquid seal sensor according to claim 1, wherein the liquid seal part comprises two flexible diaphragms and two flexible films arranged on opposite sides of the detecting part.

5. The liquid seal sensor according to claim 1, wherein the detecting part is any one of a contact device, a capacitive device, a piezoelectric device, or an optical detecting device.

6. The liquid seal sensor according to claim 1, further comprising a movable body that is freely movable in the liquid in the liquid seal part; and a control part that returns the moved movable body to a standby position in the liquid seal part.

7. The liquid seal sensor according to claim 6, wherein the movable body has a specific gravity greater than that of the liquid.

8. The liquid seal sensor according to claim 6, wherein the movable body is formed in a spherical shape, and the control part is formed in a concave shape to hold the movable body.

9. The liquid seal sensor according to claim 6, wherein the movable body is formed of one of a magnetic metal material or a magnetic member that generates magnetic force, and the control part is formed of the other.

10. A liquid seal sensor comprising: a flexible diaphragm covered by and sealed to a flexible film to form therebetween an airtight chamber ; a liquid sealed within the chamber and responsive to acceleration of the liquid seal sensor to undergo movement within the chamber in the direction of the acceleration thereby flexibly distorting the diaphragm and the flexible film and changing the weight distribution of the liquid in the chamber; and a detecting part that detects the acceleration based on the change in weight distribution of the liquid.

11. A liquid seal sensor according to claim 10; wherein the detecting part includes a plurality of spaced-apart movable contacts on an underside of the diaphragm, and a plurality of fixed contacts positioned beneath and spaced from respective movable contacts so that downward flexing of the diaphragm moves one or more of the movable contacts into contact with one or more of the fixed contacts.

12. A liquid seal sensor according to claim 10; wherein the detecting part comprises an array of normally open contacts that are closed according to changes in the weight distribution of the liquid.

13. A liquid seal sensor according to claim 10; wherein the detecting part comprises an array of optical detecting devices that receive light passing through the liquid, the intensity of light passing through the liquid varying according to changes in the weight distribution of the liquid.

14. A liquid seal sensor according to claim 10; wherein the detecting part comprises an array of piezoelectric devices that output signals in dependence on the pressure exerted thereon by the liquid, the pressure exerted by the liquid varying according to changes in the weight distribution of the liquid.

15. A liquid seal sensor according to claim 10; further including a movable body freely movable in the liquid within the chamber and that occupies a standby position when the liquid seal sensor is not subjected to acceleration; and a control part that returns the moved movable body to the standby position.

16. A liquid seal sensor according to claim 15; wherein the movable body has a specific gravity greater than that of the liquid.

17. A liquid seal sensor according to claim 15; wherein the movable body has a spherical shape; and the control part comprises a concavely shaped bottom portion of the chamber.

18. A liquid seal sensor according to claim 15; wherein the movable body is formed of one of a magnet or a magnetic material, and the control part is formed of the other of the magnet or the magnetic material.

19. A liquid seal sensor according to claim 10; wherein the liquid is silicone oil.

20. A liquid seal sensor according to claim 10; wherein the flexible film is composed of paraxylylene.

21. The liquid seal sensor according to claim 5, wherein the detecting part comprises an optical detecting device, and the flexible film is covered with a light shielding film having an opening for admitting light.

22. The liquid seal sensor according to claim 9, wherein the control part comprises a magnetic coil electrically connected to wiring for flowing current through the magnetic coil to generate a magnetic force to return the movable body to its standby position.

* * * * *